United States Patent
Yokoi et al.

(10) Patent No.: US 7,007,136 B2
(45) Date of Patent: Feb. 28, 2006

(54) STORAGE DEVICE AND CACHE MEMORY DEVICE IN SET ASSOCIATIVE SYSTEM

(75) Inventors: Megumi Yokoi, Kawasaki (JP); Masaki Ukai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 241 days.

(21) Appl. No.: 10/341,456

(22) Filed: Jan. 14, 2003

(65) Prior Publication Data

US 2004/0003176 A1    Jan. 1, 2004

(30) Foreign Application Priority Data

Jun. 28, 2002   (JP) .............................. 2002-191017

(51) Int. Cl.
*G06F 12/12* (2006.01)

(52) U.S. Cl. ...................................... 711/133; 711/128

(58) Field of Classification Search ................ 711/128, 711/133–136
See application file for complete search history.

(56) References Cited

U.S. PATENT DOCUMENTS 5,778,432 A * 7/1998 Rubin et al. ................. 711/135
6,681,295 B1 * 1/2004 Root et al. ................... 711/128

\* cited by examiner

*Primary Examiner*—Matthew D. Anderson
(74) *Attorney, Agent, or Firm*—Staas & Halsey LLP

(57) ABSTRACT

A storage device in a set associative system includes N-pieces (N is an integer of 2 or larger) of ways each having a plurality of entries containing at least replace flags and predetermined data, an acquisition unit acquiring the replace flags contained in the entries specified by the same address from the N-pieces of ways, and a selection unit selecting a replace target way on the basis of the replace flags acquired by the acquisition unit.

18 Claims, 16 Drawing Sheets

| READOUT REPLACE FLAGS | | | | REPLACE TARGET WAYS DETERMINED BY REPLACE FLAGS | | | |
|---|---|---|---|---|---|---|---|
| WAY0 | WAY1 | WAY2 | WAY3 | WAY0 | WAY1 | WAY2 | WAY3 |
| 0 | 0 | 0 | 0 | O | | | |
| 1 | 0 | 0 | 0 | | O | | |
| 1 | 1 | 0 | 0 | | | O | |
| 1 | 1 | 1 | 0 | | | | O |
| 1 | 1 | 1 | 1 | O | | | |
| 0 | 1 | 1 | 1 | | O | | |
| 0 | 0 | 1 | 1 | | | O | |
| 0 | 0 | 0 | 1 | | | | O |
| 1 | 0 | 1 | 0 | O | | | |
| 0 | 0 | 1 | 0 | | O | | |
| 0 | 1 | 1 | 0 | | | O | |
| 0 | 1 | 0 | 0 | | | | O |
| 0 | 1 | 0 | 1 | O | | | |
| 1 | 1 | 0 | 1 | | O | | |
| 1 | 0 | 0 | 1 | | | O | |
| 1 | 0 | 1 | 1 | | | | O |

FIG. 5

| READOUT REPLACE FLAGS | | | | REPLACE TARGET WAYS DETERMINED BY REPLACE FLAGS | | | |
|---|---|---|---|---|---|---|---|
| WAY0 | WAY1 | WAY2 | WAY3 | WAY0 | WAY1 | WAY2 | WAY3 |
| 0 | 0 | 0 | 0 | O | | | |
| 1 | 0 | 0 | 0 | | O | | |
| 1 | 1 | 0 | 0 | | | O | |
| 1 | 1 | 1 | 0 | | | | O |
| 1 | 1 | 1 | 1 | O | | | |
| 0 | 1 | 1 | 1 | | O | | |
| 0 | 0 | 1 | 1 | | | O | |
| 0 | 0 | 0 | 1 | | | | O |
| 1 | 0 | 1 | 0 | O | | | |
| 0 | 0 | 1 | 0 | | O | | |
| 0 | 1 | 1 | 0 | | | O | |
| 0 | 1 | 0 | 0 | | | | O |
| 0 | 1 | 0 | 1 | O | | | |
| 1 | 1 | 0 | 1 | | O | | |
| 1 | 0 | 0 | 1 | | | O | |
| 1 | 0 | 1 | 1 | | | | O |

FIG. 6

| READOUT REPLACE FLAGS | | | | FLAG INVERTING WHEN BECOMING REPLACE TARGET WAY DUE TO BEING INVALID | | | |
|---|---|---|---|---|---|---|---|
| WAY0 | WAY1 | WAY2 | WAY3 | WAY0 | WAY1 | WAY2 | WAY3 |
| 0 | 0 | 0 | 0 | INVERT | INVERT | | |
| 1 | 0 | 0 | 0 | | INVERT | INVERT | |
| 1 | 1 | 0 | 0 | | | INVERT | INVERT |
| 1 | 1 | 1 | 0 | INVERT | | | INVERT |
| 1 | 1 | 1 | 1 | INVERT | INVERT | | |
| 0 | 1 | 1 | 1 | | INVERT | INVERT | |
| 0 | 0 | 1 | 1 | | | INVERT | INVERT |
| 0 | 0 | 0 | 1 | INVERT | | | INVERT |
| 1 | 0 | 1 | 0 | INVERT | INVERT | | |
| 0 | 0 | 1 | 0 | | INVERT | INVERT | |
| 0 | 1 | 1 | 0 | | | INVERT | INVERT |
| 0 | 1 | 0 | 0 | INVERT | | | INVERT |
| 0 | 1 | 0 | 1 | INVERT | INVERT | | |
| 1 | 1 | 0 | 1 | | INVERT | INVERT | |
| 1 | 0 | 0 | 1 | | | INVERT | INVERT |
| 1 | 0 | 1 | 1 | INVERT | | | INVERT |

FIG. 7
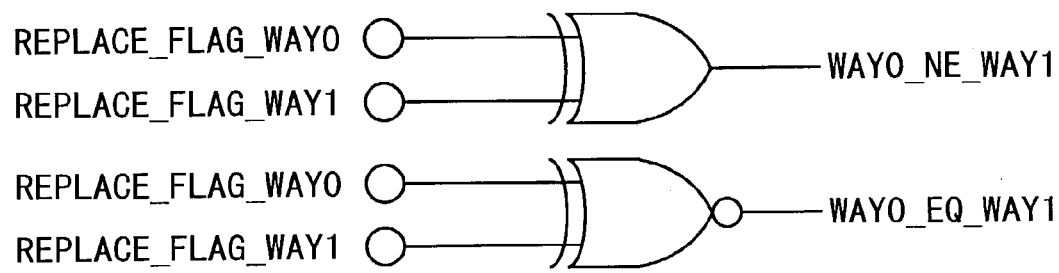
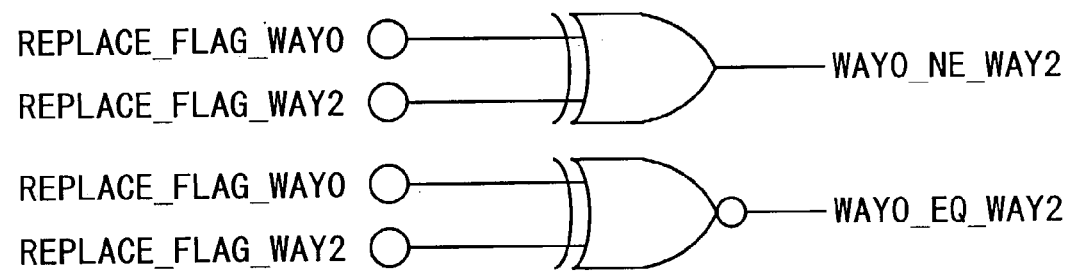
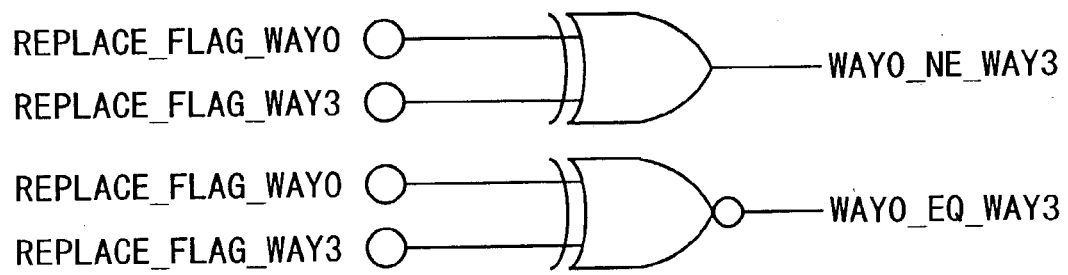

FIG. 8
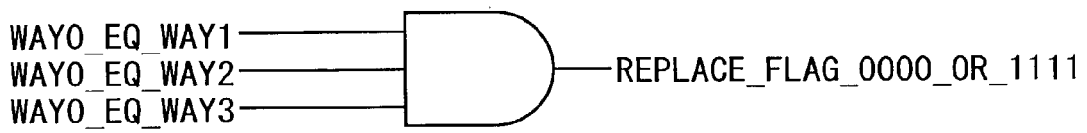
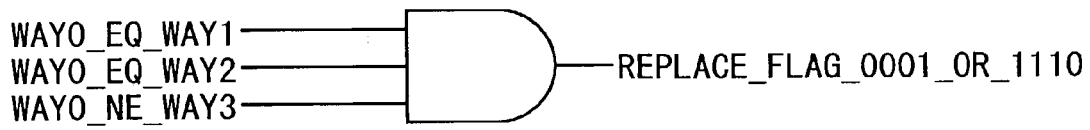
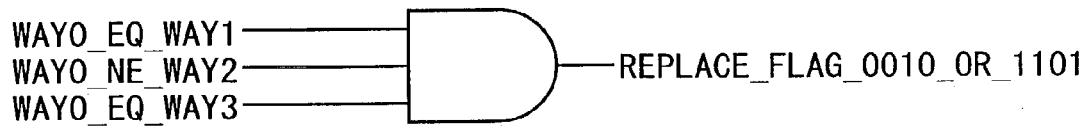
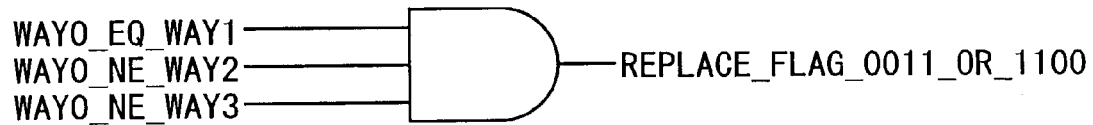
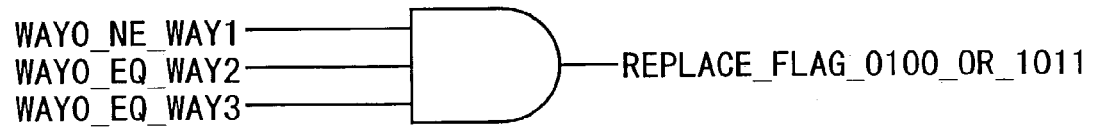
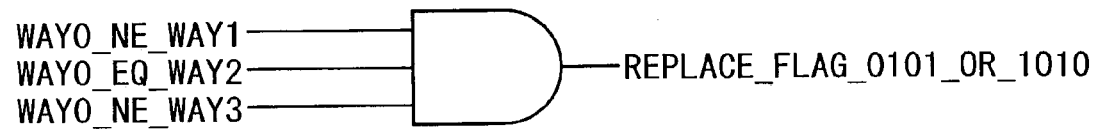
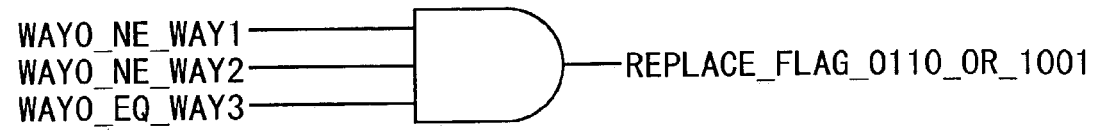
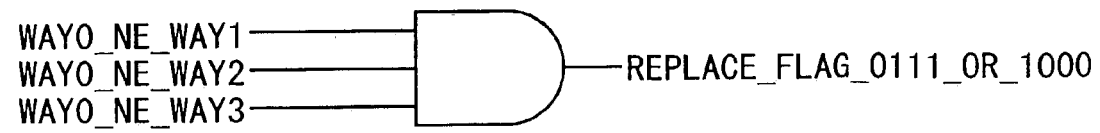

FIG. 9
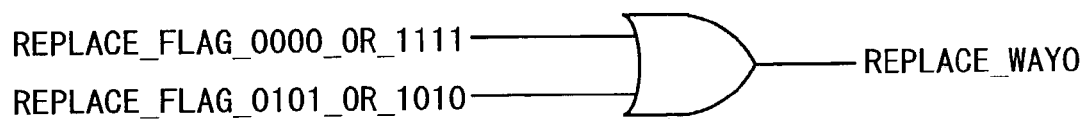
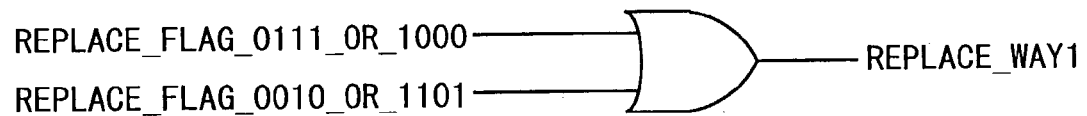
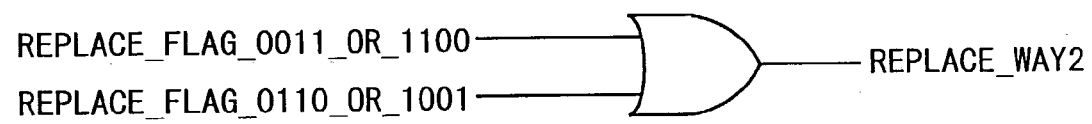
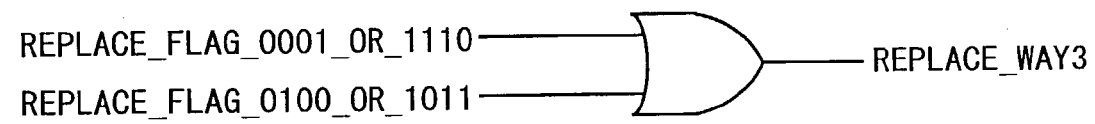

STORAGE DEVICE AND CACHE MEMORY DEVICE IN SET ASSOCIATIVE SYSTEM

BACKGROUND OF THE INVENTION

The present invention relates to a technology of selecting a replace target way in a storage device having N-pieces of ways in a set associative system.

In the storage device having the N-pieces of ways in the set associative system, when registering new pieces of information, if storage areas of the storage device have already been all used with no registerable space left, it is required that some pieces of information to be deleted from the storage device be selected from the stored information and be replaced with the new pieces of registration information. A selection method thereof may be an LRU (Least Recently Used) algorithm for preferentially deleting the information that has not been used recently.

It needs, however, a good deal of cost to execute the LRU algorithm. The number of bits required at the minimum for executing the LRU algorithm is $C(n,2)=n!/(r!(n-2)!)$ in the N-way device. For example, the device having the 4-ways needs 6-bit flags at the minimum, and these flags for the number of pipeline stages are sent round within the device. The device begins to work at a 6-fold cost, and therefore it follows that the cost becomes increasingly large with an increased number of pipeline stages. Other than the LRU, there are methods by which the flags indicating the replacement are set per way, however, those methods proposed so far are designed for 2 ways and unable to be applied to 3 or more ways, and hence a new technique needs to be developed.

It is an object of the present invention to provide a technology capable of selecting a way including an entry in which registration and replacement are conducted in a storage device having N-pieces of ways in a set associative system at a cost that is by far lower than by an LRU algorithm while exhibiting a performance approximate to the LRU.

SUMMARY OF THE INVENTION

To accomplish the above object, according to one aspect of the present invention, a storage device in a set associative system includes N-pieces (N is an integer of 2 or larger) of ways each having a plurality of entries containing at least replace flags and predetermined data, an acquisition unit acquiring the replace flags contained in the entries specified by the same address from the N-pieces of ways, and a selection unit selecting a replace target way on the basis of the replace flags acquired by the acquisition unit.

According to the present invention, the replace target way (entries) can be selected based on the replace flags of a comparatively low bit (normally 1 bit), which are retained in the respective entries. Therefore, in the storage device having the N-pieces of ways in the set associative system, the way including the entry in which the registration and replacement are conducted can be selected at a cost that is far lower than by the LRU algorithm in a way that exhibits a performance approximate to the LRU.

The storage device in the set associative system may further include a predetermined data update unit updating the predetermined data contained in the entry included in the way selected by the selection unit among the entries specified by the same address.

With this configuration, the predetermined data (e.g., a branch address) contained in the entry included in the way selected by the selection unit, can be updated.

The storage device in the set associative system may further include a replace flag update unit updating the replace flags contained in the entry included in the way selected by the selection unit among the entries specified by the same address so that the way including the entry containing the predetermined data updated latest by the predetermined data update unit is selected as late as possible.

With this configuration, the way as by the LRU algorithm can be selected as the replace target way.

In the storage device in the set associative system, the replace flag update unit may execute updating based on the 1-bit replace flag.

The storage device in the set associative system may further include a judging unit judging whether all the entries specified by the same address are valid or not, and the selection unit, when the judging unit judges that at least one entry is invalid, may select the way having the invalid entry irrespective of the replace flags.

With this scheme, even when there exists the invalid entry among the entries specified by the same address, the way as by the LRU algorithm can be selected as the replace target way.

In the storage device in the set associative system, each of the entries may contain valid flags, the acquisition unit may acquire the valid flags contained in the entries specified by the same address, and the judging unit may judge based on the valid flags acquired by the acquisition unit whether all the entries are valid or not.

With this scheme, even when there exists the invalid entry among the entries specified by the same address, the way as by the LRU algorithm can be selected as the replace target way on the basis of the valid flags of a comparatively low bit (normally 1-bit), which are retained in the respective entries.

The storage device in the set associative system may further include a branch prediction unit performing a branch prediction on the basis of the same address, and the selection unit, if the branch prediction unit does not predict branching, may select a replace target way.

With this scheme, if the branch prediction unit could not properly execute the branch prediction, the replace target way (entry) can be selected based on the replace flags of a comparatively low bit (normally 1-bit), which are retained in the respective entries.

According to another aspect of the present invention, a cache memory device in a set associative system, includes N-pieces (N is an integer of 2 or larger) of ways each having a plurality of entries containing at least replace flags and predetermined data, an acquisition unit acquiring the replace flags contained in the entries specified by the same address from the N-pieces of ways, and a selection unit selecting a replace target way on the basis of the replace flags acquired by the acquisition unit.

In the storage device (or the cache memory device) in the set associative system, when there occur the data required to be registered afresh with no space for registering the same data afresh, the new data need to be replaced with the data that are as old as possible and thus be registered.

For actualizing this, each way has the replace flags, and the replace flags of all the ways are integrated, thereby handling the flags as if by a state machine indicating the replace target way. Namely, each time the storage device is referred to, values of the replace flags are changed according to a rule, and a next replace target way is determined in a way that adjusts the values of the replace flags of all the ways.

A replace flag change rule is set so that the way with a new registration including a replacement thereafter comes to have a next replace target chance as late as possible. Further, if there exists an invalid way, the processing is executed so as to perform a new registration with respect to this invalid way irrespective of the values of the replace flags. According to this system, an actual change of the replace flags involves just changing only the flags of the replace target way, and there are transmitted only a signal indicating the selected way and values of the changed flags of the way concerned.

If the invalid way exists in the readout entry, the replace flags are likewise changed based on the rule and then sent. In this case also, there are transmitted only the signal indicating the invalid way and values of the changed flags. In response to a request from an external device of the storage device, there are executed updating and a new registration of the entry with respect to the way, which are sent from the storage device. The replace flags are registered afresh at this time.

Thus, the signals transmitted round within the circuit are only 1 bit of the replace flag of the way and the signal count bit indicating the way. If this method is the LRU, there are required the number of bits corresponding to the number of selection ways of selecting arbitrary two ways among all the ways. In the case of, e.g., the 4-way set associative system, the number of bits is 6 bits. The way indicating signal is needed regardless of the replace flag system, and hence it follows that the LRU requires a 6-fold cost in the case of the 4 ways a compared with the present system. There is obviously a larger difference in cost as the pipeline stages becomes more divided.

BRIEF DESCRIPTION OF THE DRAWINGS

FIG. 5 is an explanatory diagram showing a replace target way selected when all valid flags are valid in the storage device in the 4-way set associative system in the embodiment of the present invention;

FIG. 6 is an explanatory diagram showing a replace flag inverted when at least one valid flag is invalid in the storage device in the 4-way set associative system in the embodiment of the present invention;

FIG. 7 is an explanatory diagram showing a logic circuit for actualizing the replace target way selection unit included in the storage device in the 4-way set associative system in the embodiment of the present invention;

FIG. 8 is an explanatory diagram showing the logic circuit for actualizing the replace target way selection unit included in the storage device in the 4-way set associative system in the embodiment of the present invention;

FIG. 9 is an explanatory diagram showing the logic circuit for actualizing the replace target way selection unit included in the storage device in the 4-way set associative system in the embodiment of the present invention;

DETAILED DESCRIPTION OF THE PREFERRED EMBODIMENTS

A storage device in an N-way set associative system will be described by way of an embodiment of the present invention. Herein, "N" is an integer of 2n (e.g., 2, 4, 8, 16, 32 . . . ) or other integets (equal to or larger than 2). According to this embodiment, a storage device based on the N-way (N=4) set associative system will be explained.

Figure 1:
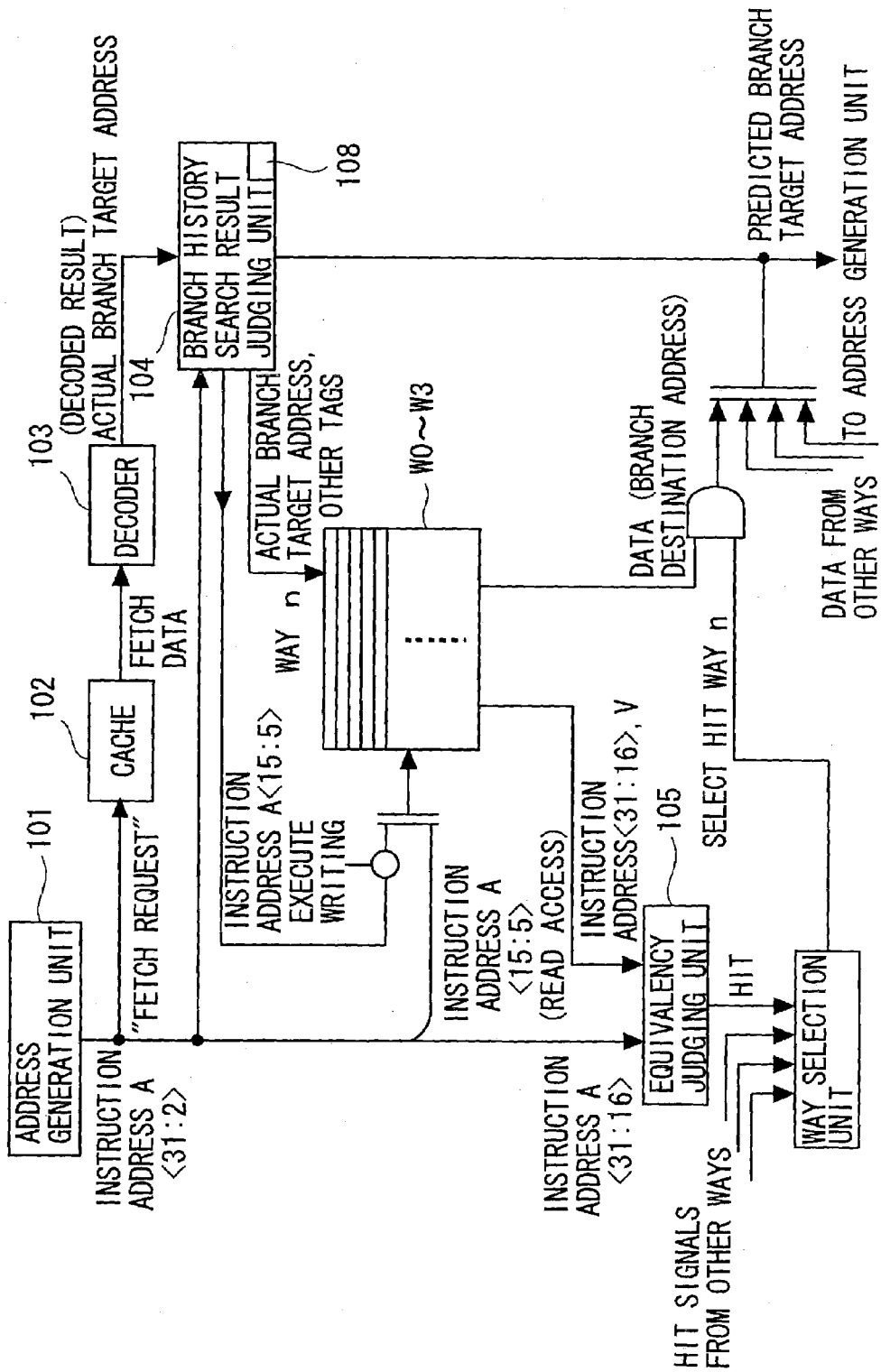
FIG. 1 is an explanatory diagram showing an outline of architecture of a storage device in a 4-way set associative system in an embodiment of the present invention.
Figure 2:
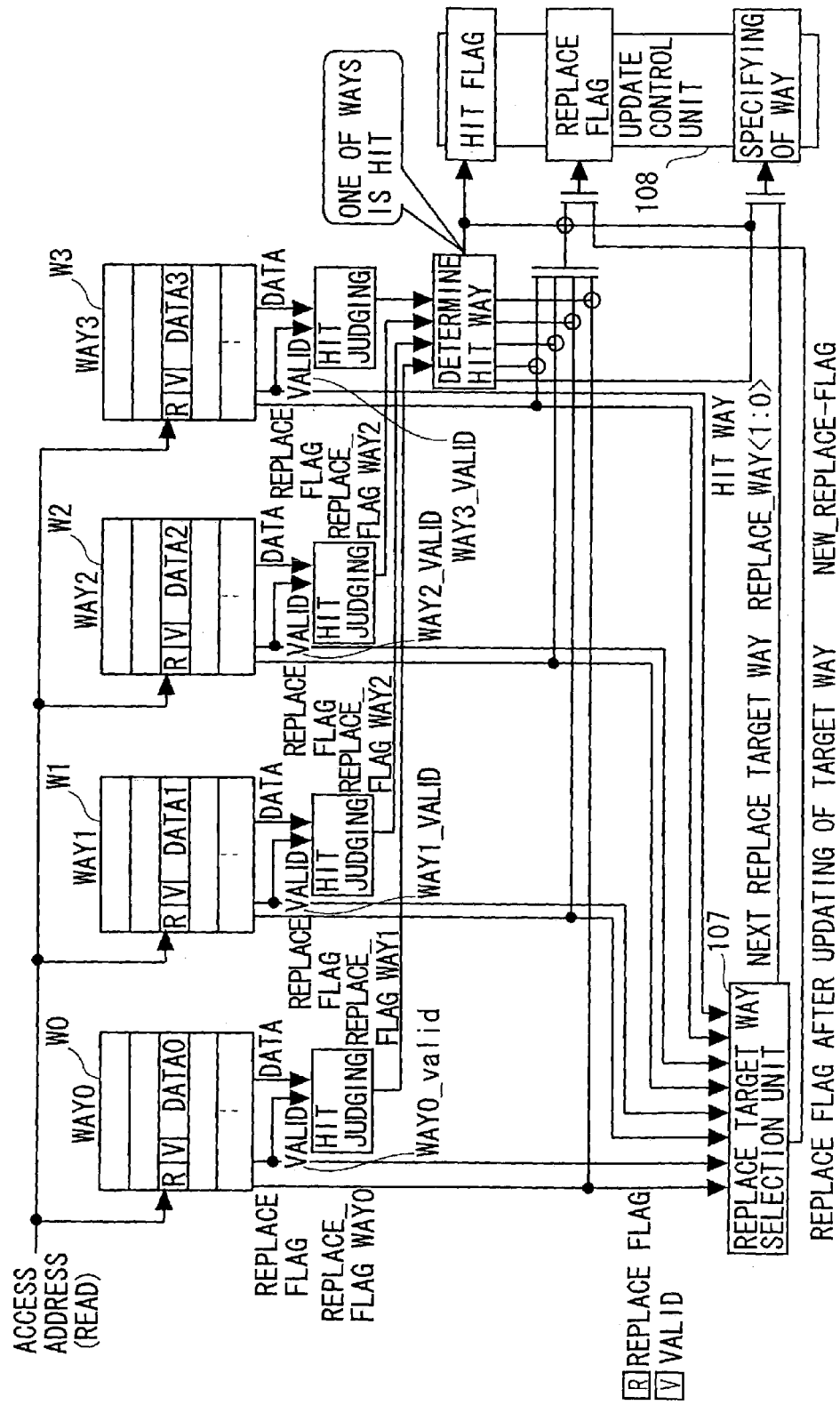
FIG. 2 is an explanatory diagram showing an outline of architecture of the storage device in the 4-way set associative system in the embodiment of the present invention.

FIGS. 1 and 2 are explanatory diagrams each showing an outline of architecture of the storage device in the 4-way set associative system in this embodiment of the present invention.

As illustrated in FIGS. 1 and 2, a storage device 100 includes mainly a branch history storage unit having four ways W0 through W3, an address generation unit 101, a cache memory 102, a decoder 103, a branch history search result judging unit 104, an equivalency judging unit 105, a hit way selection unit 106, a replace target way selection unit 107 and an update control unit 108. These components are connected to each other via a bus etc.

Figure 3:
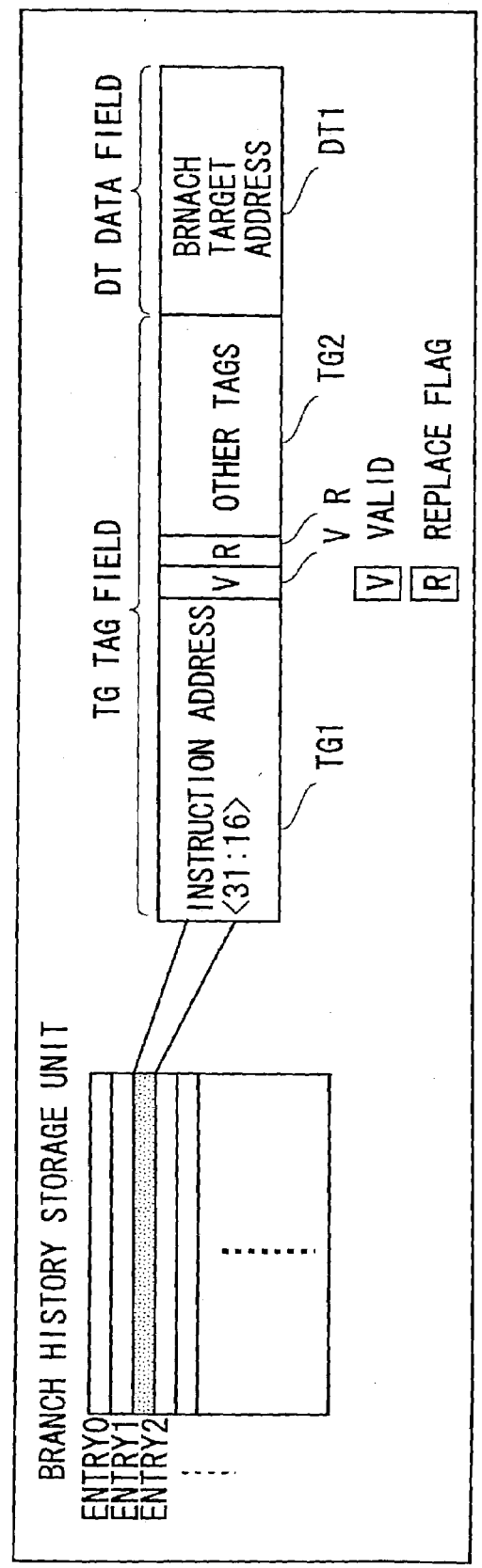
FIG. 3 is an explanatory diagram showing a structure of ways (branch history storage units) included in the storage device in the 4-way set associative system in the embodiment of the present invention.

FIG. 3 is an explanatory diagram showing an architecture of each way (the branch history storage unit) Each of the ways W0 through W3 may be defined as a storage unit accessible at a comparatively high speed such as an SRAM (Static Random Access Memory) and so on. As shown in FIG. 3, each of the ways W0 through W3 has a plurality of entries. Each entry includes a tag field and a data field DT. The tag field TG consists of (a part of) an instruction address TG1, a valid flag V, a replace flag R and other flag TG2. The data field DT consists of a branch target address DT1 as a predetermined piece of data.

The entry is specified by a part (e.g., <15:5>) of an instruction address A outputted from the address generation unit 101. According to this embodiment, the 4-way system is adopted, and hence the four entries are specified. Further, among these four entries, one entry specified by a part (e.g., <31:16>) of the instruction address A is determined. For determining this one entry, the instruction address TG1 is stored with a instruction address (e.g., <31:16>). For example, a structure is that the entry is determined by use of the part <15:5> of the instruction address A when registering, and remaining parts are stored as data in the tag field (containing the instruction address TG1). Note that a description such as the instruction address <31:16> implies that the instruction address TG1 is the 16th bit from the 31st bit as a part of the instruction address (e.g., 32 bits).

The valid flag V is a flag indicating that the entry is valid or not. For instance, if the valid flag V is "1", this indicates that the entry containing this valid flag V is valid, and if the valid flag V is "0", this indicates that the entry containing this valid flag V is invalid. The valid flag V is used also for selecting the replace target way.

The replace flag R is a flag used for selecting the replace target way. A branch target address of a branch instruction which executed previously is stored in a branch target address DT1.

The address generation unit 101 serves to generate and output the instruction address A etc. The address generation unit 101 includes a program counter and so on. The cache memory 102 is a storage unit accessible at a comparatively high speed such as the SRAM etc. The decoder 103 serves to decode the branch instruction etc fetched from the cache memory 102 (or the main storage unit).

The branch history search result judging unit 104 judges whether or not a branch target address obtained from a branch prediction unit is coincident with the branch target address of the branch instruction fetched from a memory area (of the cache memory 102 or the main storage unit), i.e., whether the prediction is correct or not. The equivalency judging unit 105 compares (the part of) the instruction address A outputted from the address generation unit 101 with the instruction address TG1 in the tag field TG, and outputs, if there exists the coincident instruction address TG1, a hit signal (that is a bit indicating a hit) . The hit way selection unit 106 outputs a hit way selection signal for specifying a hit way on the basis of the hit signal from each way.

Figure 4:
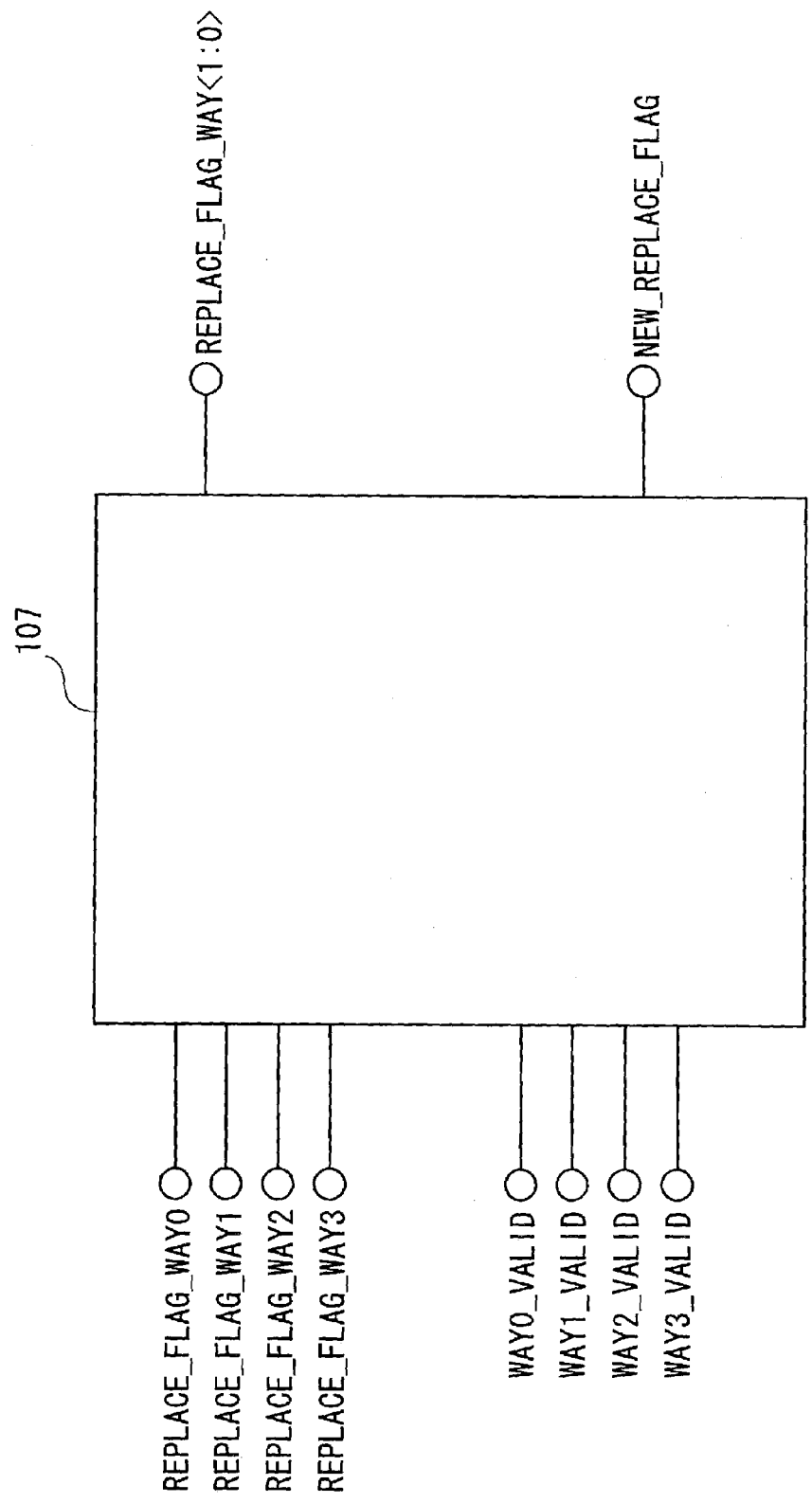
FIG. 4 is an explanatory diagram showing an outline of configuration of a replace target way selection unit included in the storage device in the 4-way set associative system in the embodiment of the present invention.

The replace target way selection unit 107 mainly selects the replace target way. FIG. 4 shows an outline of configuration of the replace target way selection unit 107. The replace target way selection unit 107 obtains replace flags R (replace_flag_way0,replace_flag_way1,replace_flag_way2, replace_flag_way3) and a valid flag V (way0_valid, way1_valid,way2_valid,way3_valid) contained in the entry specified by the same address A. The replace target way selection unit 107 eventually outputs a replace target way selection signal (replace_way<1:0>) for specifying a replace target way and a replace flag (new replace_flag) written to the way specified by this selection signal.

The replace target way selection unit 107 selects the replace target way on the basis of the replace flags R acquired from the respective ways W0 through W3. FIG. 5 is an explanatory diagram showing the replace target way selected by the replace flag R. FIG. 5 shows, when obtaining the left-sided replace flags R (e.g., (way0, way1, way2, way3)=(0, 0, 0, 0)) from the ways W0 through W3, that the right-sided way (e.g., the way0) marked with O is selected as the replace target way.

The replace target way selection unit 107, if all the valid flags V obtained respectively from the ways W0 through W3 are valid, outputs the replace target way signal (replace_way<1:0>) for specifying the way (determined from the relationship in FIG. 5) selected based on the replace flag R.

Further, the replace target way selection unit 107 selects the replace target way on the basis of the valid flags V obtained respectively from the ways W0 through W3. Namely, the replace target way selection unit 107, if at least one of the valid flags V obtained from the respective ways is invalid, outputs the replace target way selection signal (replace_way<1:0>) for specifying the way (containing the invalid entry) selected based on the valid flag V.

Moreover, the replace target way selection unit 107 outputs a replace flag R (new_replace_flag) to be written to the way specified by the replacement way selection signal (replace_way<1:0>). That is, the replace target way selection unit 107, if all the valid flags V acquired respectively from the ways W0 through W3 are valid, outputs a replace flag (new_replace_flag) into which to invert the replace flag R obtained from the way specified by the replace target way selection signal (replace_way<1:0>). On the other hand, the replace target way selection unit 107, if at least one of the valid flags V acquired respectively from the ways W0 through W3 is invalid, outputs the replace flag (new_replace_flag) in accordance with a table in FIG. 6.

FIG. 6 shows, when obtaining the left-sided replace flags R (e.g., (way0, way, 1, way2, way3)=(0, 0, 0, 0)) from the ways W0 through W3 and when the way (e.g., the way0) containing the invalid entry is specified by the replace target way selection signal (replace_way<1:0>) because of its being the right-sided way marked with "invert", that there is outputted the replace flag (new replace_flag) into which to invert the replace flag R obtained from the way0 specified by the above selection signal. In other cases, the replace flag (new_replace flag) is outputted as it is without inverting the replace flag R.

The replace target ways election unit 107 is actualized by a logic circuit shown by way of one example in FIGS. 7 through 12. This logic circuit is, though illustrated separately in the respective Figures for an explanatory convenience, actually one circuit into which those circuits are connected. The connective relation is shown by names of I/O signals in the respective Figures.

The update control unit 108 serves mainly to update the replace flag R of the entry contained in the way specified by the replace target way selection signal (replace_way<1:0>) among the four entries specified by the same address.

Figure 13:
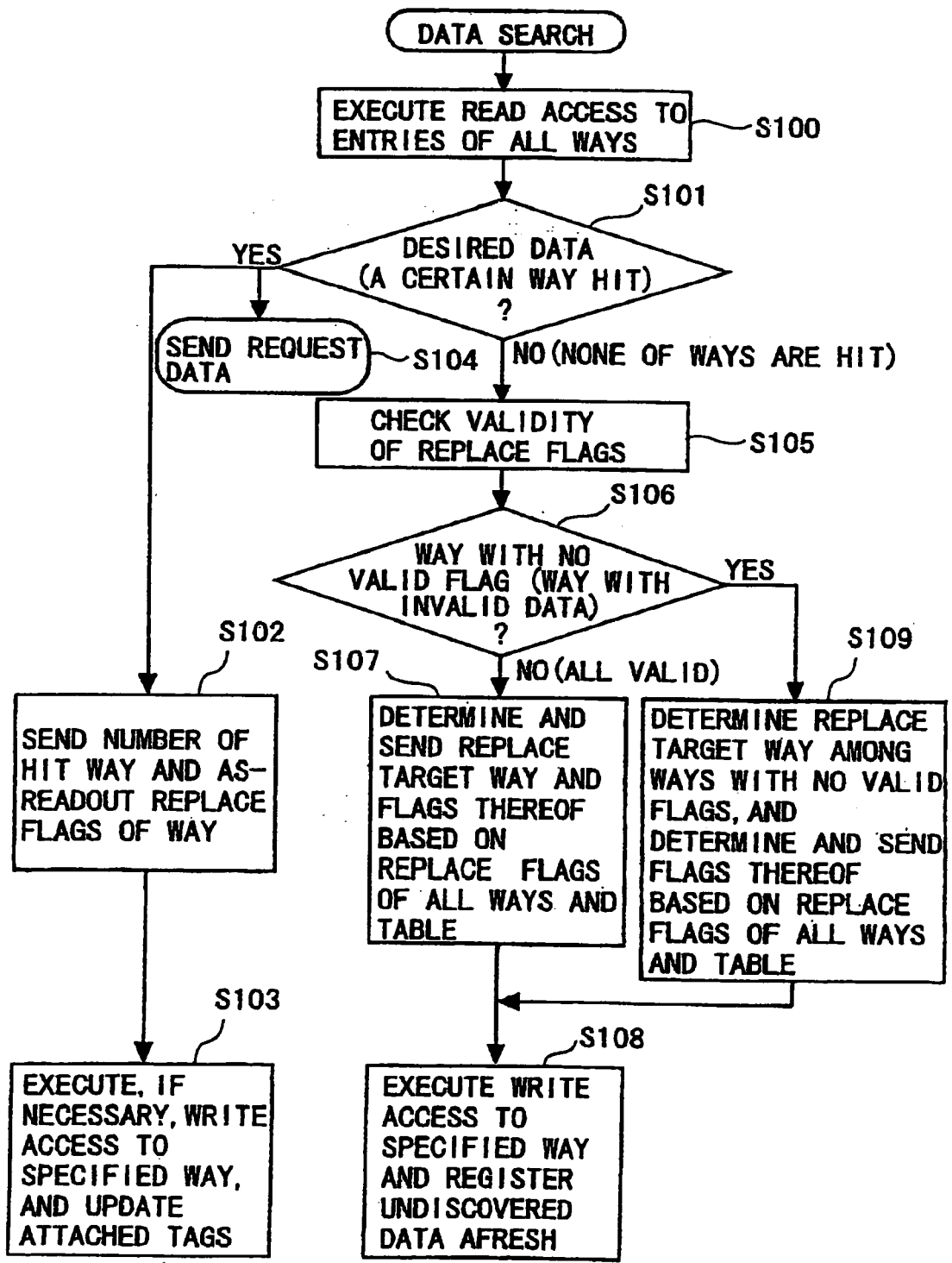
FIG. 13 is an explanatory flowchart showing an operation of the storage device in the 4-way set associative system in the embodiment of the present invention.
Figure 15:
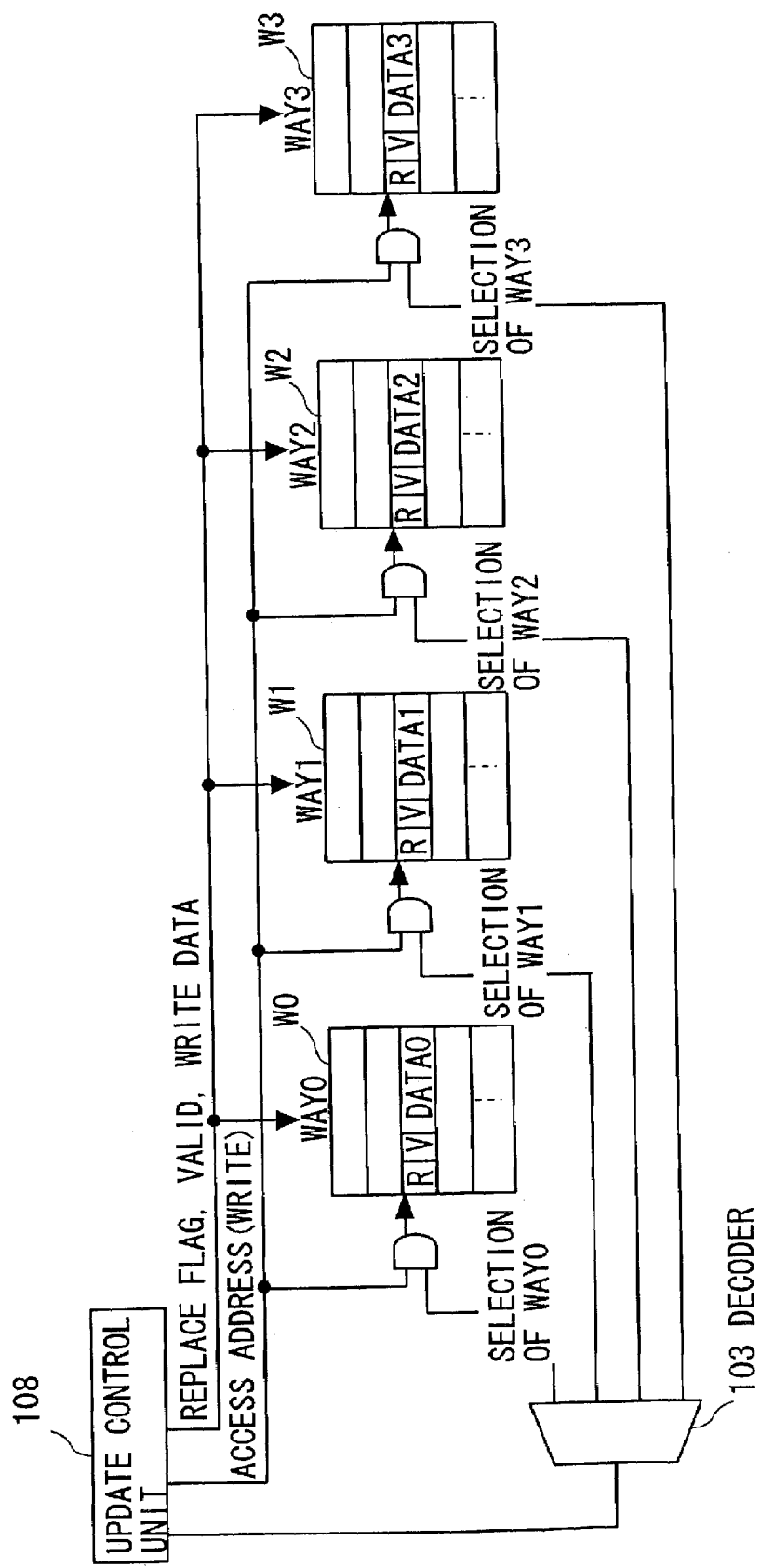
FIG. 15 is an explanatory diagram showing a control target of the storage device in the 4-way set associative system in the embodiment of the present invention.
Figure 16:
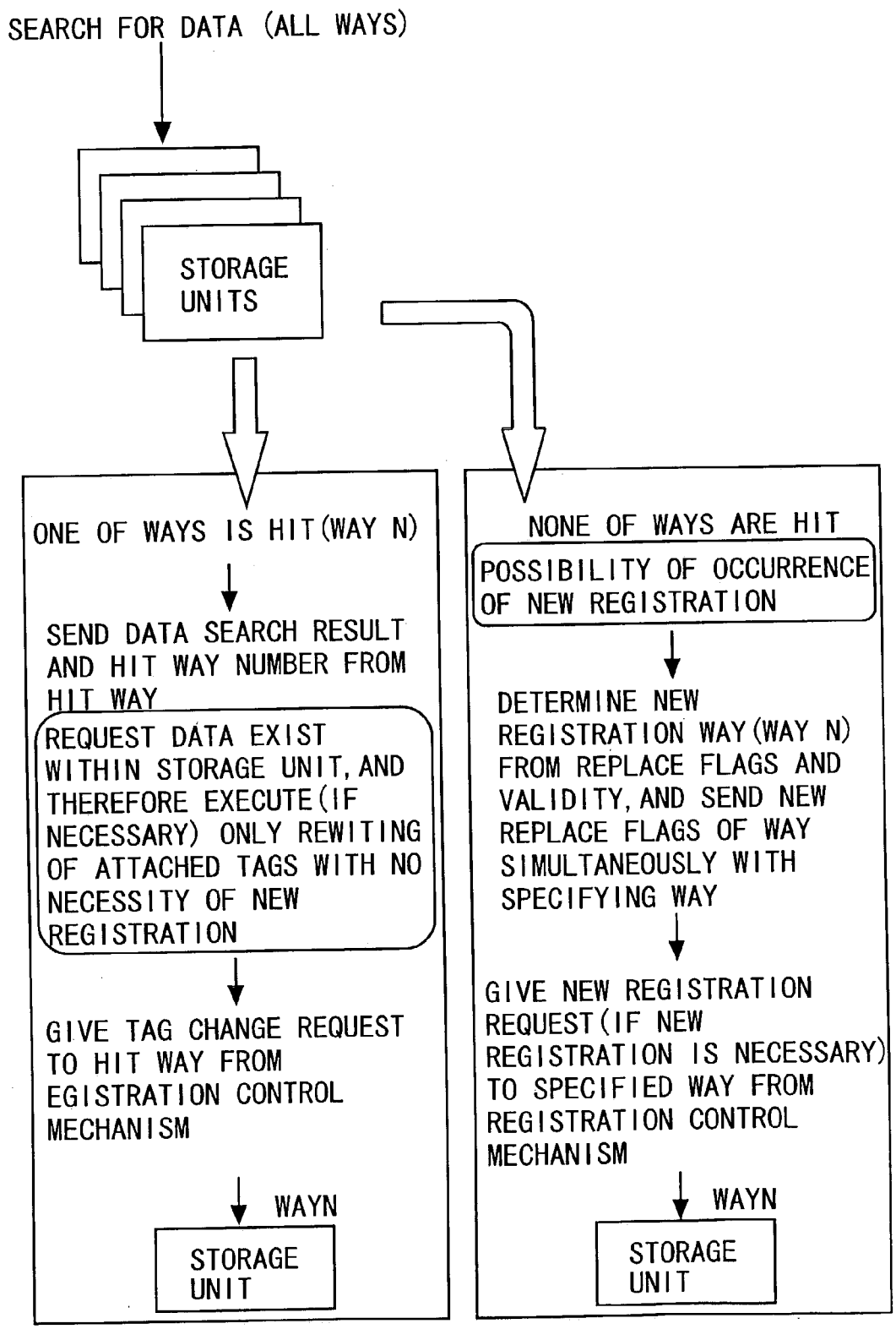
FIG. 16 is an explanatory flowchart showing an operation of the storage device in the 4-way set associative system in the embodiment of the present invention.

Next, an operation of the storage device 100 will be described with reference to the drawings. FIGS. 13 and 16 are explanatory flowcharts each showing the operation of the storage device 100. FIG. 15 is an explanatory diagram showing a control target of the update control unit 108.

To start with, an outline of the operation thereof will be explained. The instruction address A outputted from the address generation unit 101 is used for having a read-access to the branch history storage units (the ways W0 through W3) as well as for an essential access to the cache memory 102, and serves to acquire a prediction of a branch target address when a branch instruction is fetched in. The predicted branch address is sent back to the address generation unit and used for a new cache access. Simultaneously, the branch history search result judging unit 104 judges its consistency.

As a result, when judging that the instruction predicted as a branch instruction is not actually the branch instruction or, though it's the branch instruction, the branch target address stored in the branch history storage unit is incorrect, or when judging that the branch history storage unit is not hit with no branch target address obtained but with the branch instruction given, the instruction address concerned and the branch target address mapping thereto are registered afresh for a next search (which is an execution of writing) (the cache access ahead is canceled). At this time, it is determined based on the replace flag which way the address is to be registered.

Next, the operation will be explained in depth. It is assumed that the address generation unit 101 sends the instruction address A to all the ways for the read access (S100). The equivalency judging unit 105 makes a hit-judgement (S101). To be specific, the equivalency judging unit 105 reads the instruction addresses TG1 from the tag fields TG of all the entries (ways) specified by (the part of) the same address A. Then, the equivalency judging unit 105 compares the readout data with (the part of) the instruction address A and, if coincident with each other, outputs the hit signal (that is a bit representing a hit).

If the way is hit (S101: Yes), a branch target address DT and the replace flag R are read as a predicted result from the hit way and sent together with a hit way selection signal for specifying this hit way to the branch history search result judging unit 104 (S102). Simultaneously, the branch target address DT as the readout predicted result is sent also to the address generation unit 101.

The branch instruction is fetched from the area of the cache memory 102 (or the main storage unit) specified by the branch target address DT as the predicted result thereof, and is then decoded, and the actual branch target address of the fetched branched instruction is sent to the branch history search result judging unit 104. The branch history search result judging unit 104 compares the actual branch target address of the fetched branch instruction with the branch target address DT as the predicted result sent from the hit way and, if coincident with each other, continues subsequent processing on the assumption that the prediction is correct.

Whereas if not coincident with each other, the branch history search result judging unit 104, assuming that the prediction is incorrect, invalidates the valid flag of the entry contained in the way specified by the hit way selection signal as the case may be. At the same time, the branch history search result judging unit 104 inverts and registers the replace flag R sent from the hit way. Further, an attached tag is updated and so on (S103). Note that if any one of the ways is hit (S101: Yes), these pieces of data are conceived valid, and the replace flag R is not updated.

Whereas if none of the ways are hit (S101: No), the replace target way selection unit 107 selects a replace target way. This process will hereinafter be explained. Note that steps S106 through S109 are expressed in time-series for an explanatory convenience, however, the replace target way selection unit 107 is constructed of the logic circuit, and hence these steps proceed substantially at the same time. Hereinafter, the expression "substantially at the same time" is this implication.

If not hit (S101: No), the replace target way selection unit 107 acquires, from the ways W0 through W3, the replace flags R (replace_flag_way0, replace_flag_way1, replace_flag_way2, replace_flag_way3) and the valid flags V (way0_valid, way1_valid, way2_valid, way3_valid) that are contained in the four entries specified by (the parts of) the same address A (S105)

The replace target way selection unit 107 judges, based on the valid flags V acquired from the ways W0 through W3, whether all these valid flags V are valid or not (S106). This judgement is executed by an AND operation circuit C1 shown in FIG. 12 in the logic circuit configuring the replace target way selection unit 107. The valid flags V (way0_valid, way1_valid, way2_valid, way3_valid) are inputted to the AND operation circuit C1. If all these valid flags V are valid, "1" is outputted, and, if at least one valid flag V is invalid, "0" is outputted.

Herein, the discussion will be made on the assumption that all the valid flags V are valid. The replace target way selection unit 107, substantially at the same time, selects the replace target way on the basis of the replace flags R (S107). This selection is executed by the circuit elements showing in FIGS. 7, 8 and 9 in the logic circuit configuring the replace target way selection unit 107.

The replace flags R (replace_flag_way0, replace_flag_way1, replace_flag_way2, replace_flag_way3) are inputted to the logic circuit element shown in FIG. 7. The replace target way selection signals (replace_way0, replace_way1, replace_way2, replace_way3) for specifying the replace target way are outputted from the logic circuit element shown in FIG. 9 via the logic circuit elements shown in FIGS. 8 and 9.

It is herein assumed that the replace flags R (replace_flag_way0, replace_flag_way1, replace_flag_way2, replace_flag_way3)=(1,1,0,0) are inputted to the logic circuit element shown in FIG. 7. In this case, the replace target way selection signals (replace_way0, replace_way1, replace_way2, replace_way3)=(0,0,1,0) for specifying the replace target way, are outputted from the logic circuit element shown in FIG. 9. This indicates that the way 2 (determined from the relation in FIG. 5) in a bit-on position.

Figure 12:
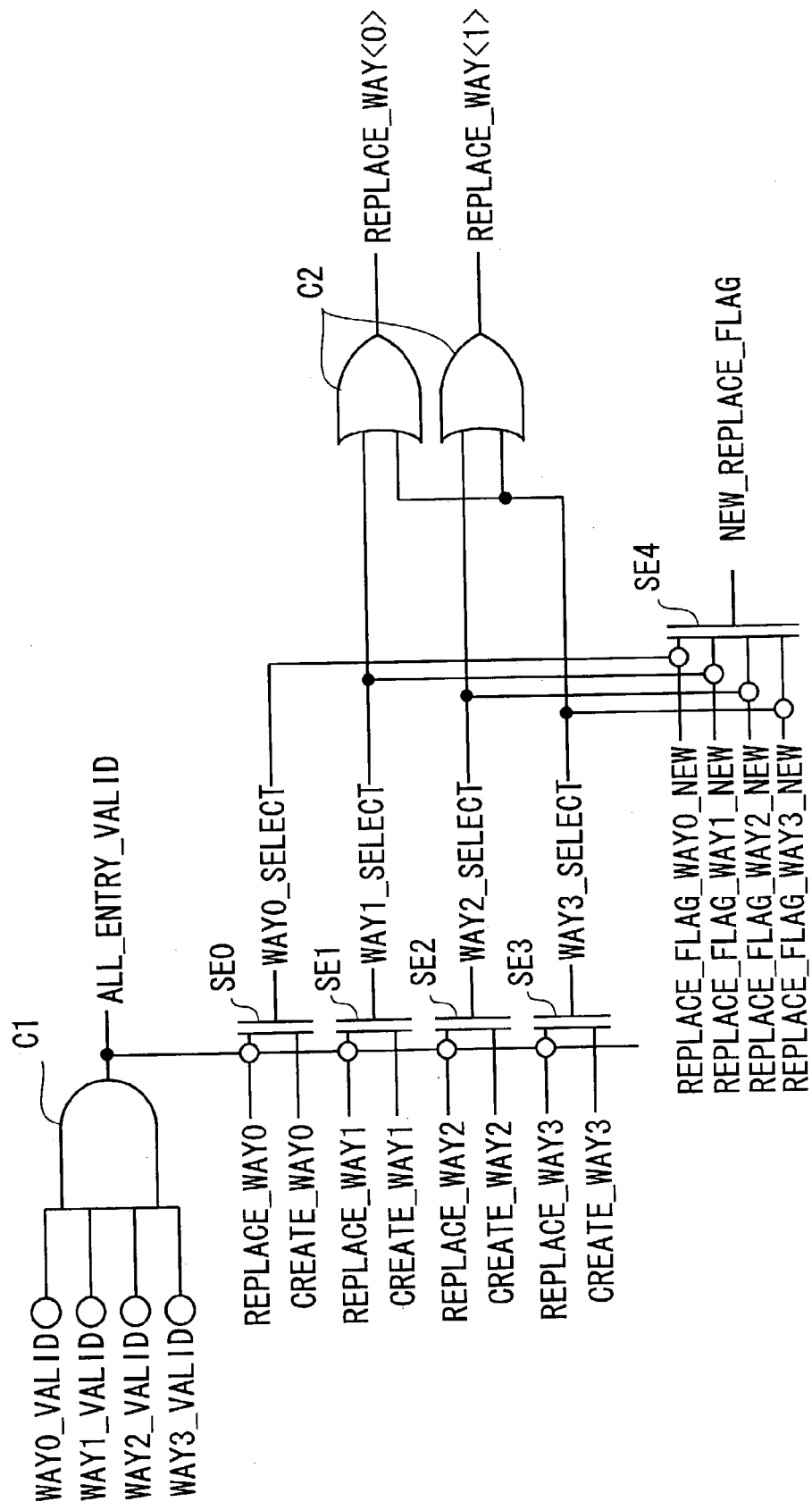
FIG. 12 is an explanatory diagram showing the logic circuit for actualizing a replace target way selection unit provided in the storage device in the 4-way set associative system in the embodiment of the present invention.

Herein, all the valid flags V are valid (S106: No, and hence an output of the AND operation circuit C1 shown in FIG. 12 is "1". Therefore, selectors SE0 through SE3 select the replace target way selection signals (replace_way0, replace_way1, replace_way2, replace_way3). The selected 4-bit replace target way selection signals are converted into 2-bit replace target way selection signals (replace_way<0>, replace_way<1>) by two pieces of OR operation circuits C2, and transmitted to the update control unit 108.

The replace target way selection unit 107, substantially at the same time, outputs a replace flag (new_replace_flag)= "1" as an inverted flag of the replace flag R="0" obtained from the way2 specified by the replace target way selection signal. This replace flag (new_replace_flag) is sent to the update control unit 108. The branch history search result judging unit 104 (the update control unit 108) updates (a part of) the instruction address of the way2 specified by the replace target way selection signal and also the actual branch target address (a piece of predetermined data) thereof (S108).

In this case, the update control unit 108 functions as a predetermined data update unit. With this operation, the update control unit 108 outputs an indication of updating the replace flag R contained in the entry specified by the same address A so that the way including the entry containing the latest updated branch target address is selected as late as possible. The replace flag (new_replace_flag)="1" is thereby written to the way2 specified by the replace target way selection signal. In this case, the update control unit 108 functions as a replace flag update unit. The replace flag R after being updated is used for selecting the replace target way next time.

Next time, if not hit (S101: No), the replace flags R (replace_flag_way0, replace_flag_way1, replace_flag_way2, replace_flag_way3)=(1,1,1,0) after being updated are thereby inputted to the replace target way selection unit 107. In this case, the replace target way selection signals (replace_way0, replace_way0, replace_way0, replace_way0)= (0,0,0,1) for specifying the replace target way, are outputted from the logic circuit element shown in FIG. 9. This indicates that if not hit (S101: No), the way3 (determined from the relation shown in FIG. 5) in the bit-on position is selected next time as the replace target way.

Thus, the replace flag R is updated according to the Table shown in FIG. 5, whereby the latest updated way is selected as late as possible.

Next, there will be explained a case where at least one valid flag V is invalid. The replace target way selection unit 107, substantially at the same time, selects the replace target way (having he invalid entry) on the basis of the valid flags V irrespective of the replace flags R. This selection is made by the circuit element shown in FIG. 10 in the logic circuit configuring the replace target way selection unit 107. Note that if a plurality of invalid entries exist, the priority is determined based on an arbitrary rule (for example, the way having the lowest number is selected).

Figure 10:
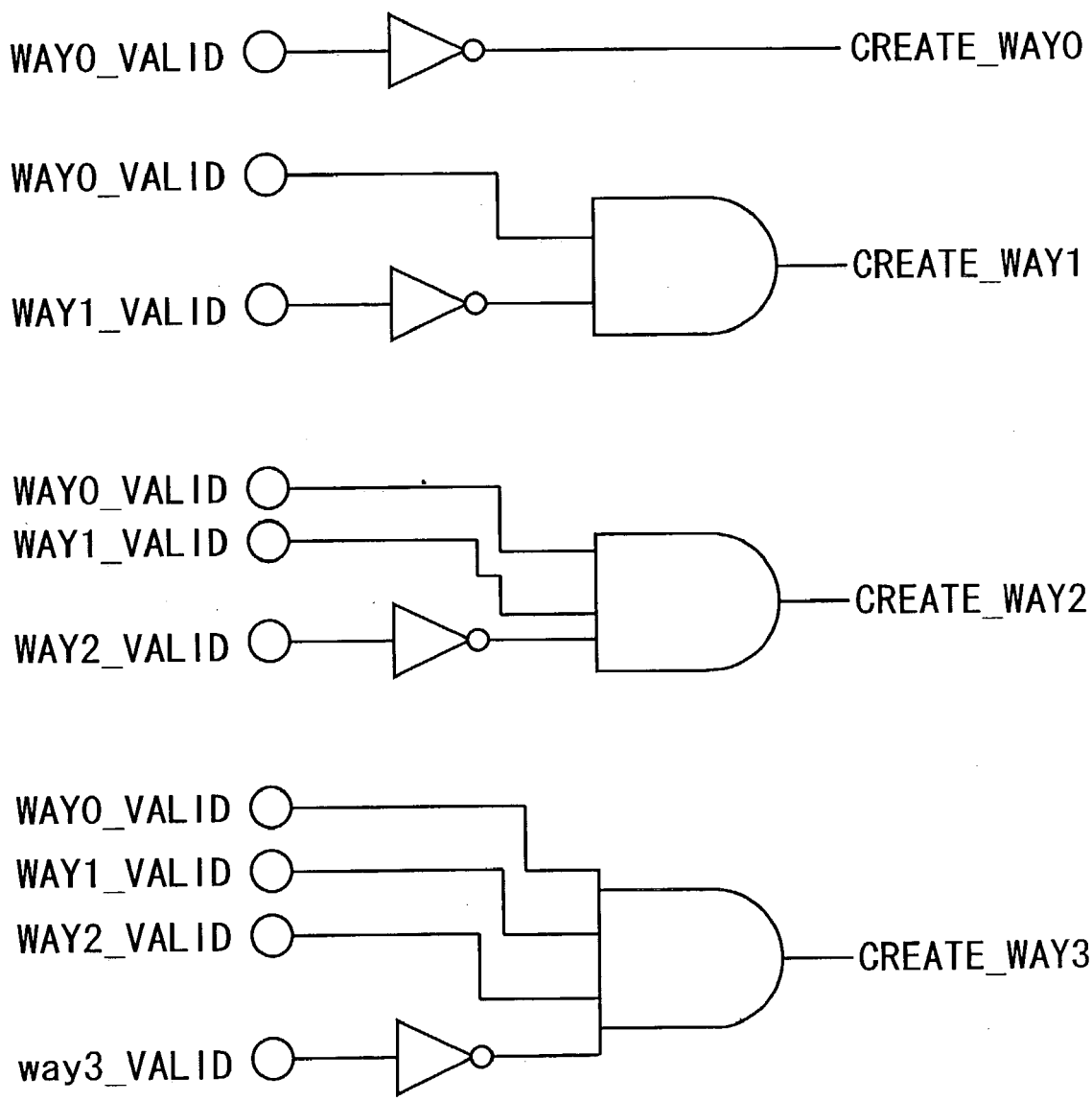
FIG. 10 is an explanatory diagram showing the logic circuit for actualizing the replace target way selection unit included in the storage device in the 4-way set associative system in the embodiment of the present invention.
Figure 11:
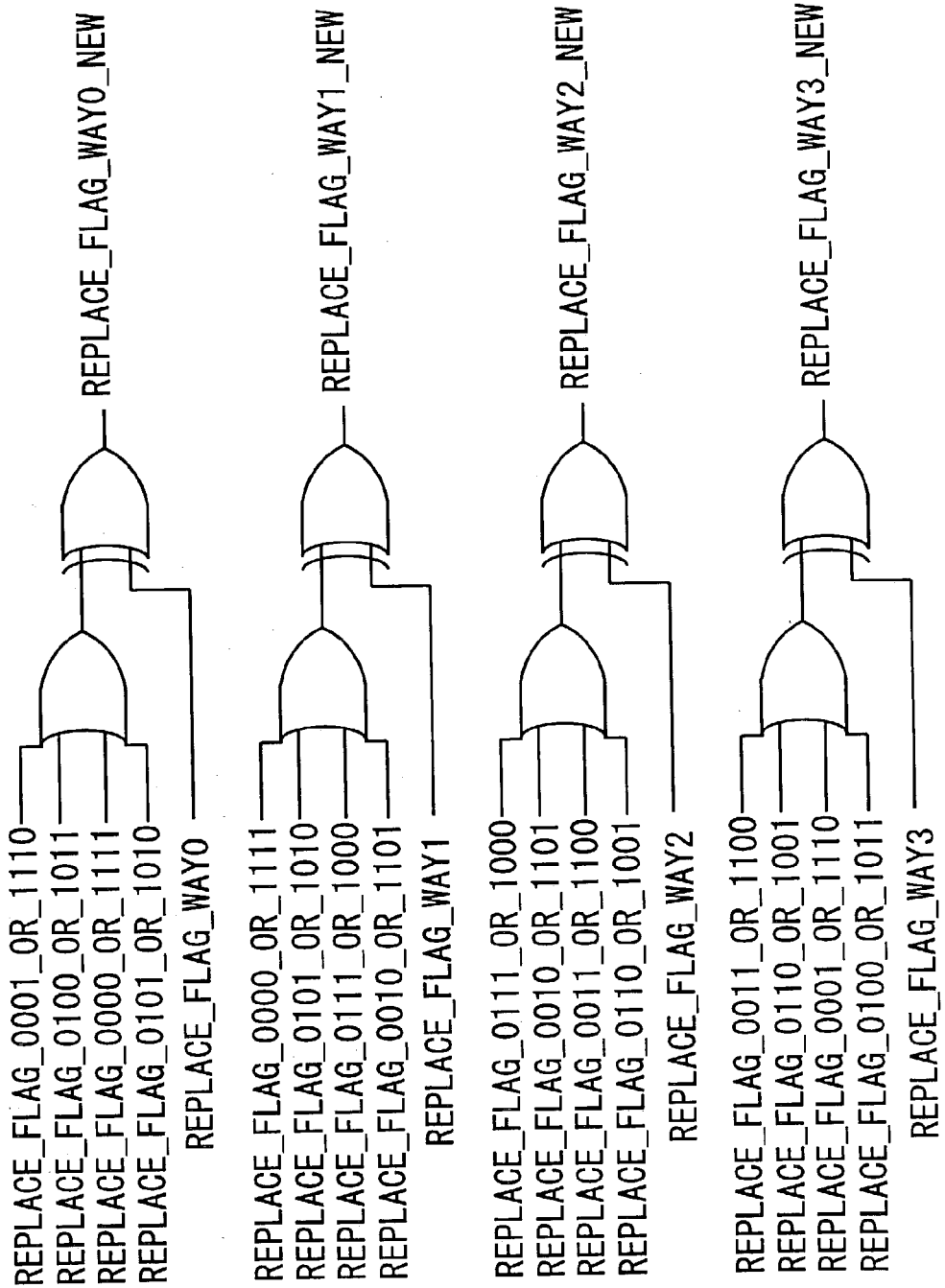
FIG. 11 is an explanatory diagram showing the logic circuit for actualizing the replace target way selection unit included in the storage device in the 4-way set associative system in the embodiment of the present invention.

The valid flags V (way0_valid, way1_valid way2_valid way3_valid) are inputted to the logic circuit element illustrated in FIG. 10, and the replace target way selection signals (create_way0, create_way1, create_way2, create_way3) for specifying the replace target way (having the invalid entry) are outputted therefrom. Herein, it is assumed that the replace flags R (replace_flag_way0, replace_flag_way1, replace_flag_way2, replace_flag_way3)=(1,1,0,0) and the valid flags V (way0_valid, way1 valid, way2_valid, way3_valid)=(1,0,1,1) are inputted to the logic circuit element shown in FIG. 10.

In this case, the replace target way selection signals (create_way0, create_way1, create_way2, create way3)=(0,1,0,0) for specifying the replace target way are outputted from the logic circuit element shown in FIG. 10. This indicates that the way1 in the bit-on position is a way having the invalid entry, and that this way1 is selected.

Herein, at east one valid flag V is invalid (S16: Yes), and hence the output of the AND operation circuit C1 shown in FIG. 12 is "0". Therefore, the selectors SE0 through SE3 select the replace target way selection signals (create_way0, create_way1, create_way2, create_way3). The selected 4-bit replace target way selection signals are converted into 2-bit replace target way selection signals (replace_way<0>, replace_way<1>) by the two pieces of OR operation circuits C2, and transmitted to the update control unit 108.

The replace target way selection unit 107, substantially at the same time, based on the rule shown in FIG. 6, outputs the replace flag (new_replace_flag)="1" into which to effect no inversion of the replace flag R="1" that is obtained from the way1 specified by the replace target way selection signal. This replace flag (new_replace_flag) is sent to the update control unit 108. The branch history search result judging unit 104 (the update control unit 108) updates (a part of) the instruction address of the way1 specified by the replace target way selection signal and also the actual branch target address (the predetermined data) thereof (S108).

In this case, the update control unit 108 functions as the predetermined data update unit. With this operation, the update control unit 108 outputs the indication of updating the replace flag R contained in the entry specified by the same address A so that the way including the entry containing the latest updated branch target address is selected as late as possible. The replace flag (new_replace_flag)="1" is thereby written to the way1 specified by the replace target way selection signal. In this case, the update control unit 108 functions as a replace flag update unit. The replace flag R after being updated is used for selecting the replace target way next time.

Next time, if not hit (S101: No), the replace flags R (replace_flag_way0, replace_flag_way1, replace_flag_way2, replace_flag_way3)=(1,1,1,0) after being updated are thereby inputted to the replace target way selection unit 107. In this case, the replace target way selection signals (replace_ way0, replace_way0, replace_way0, replace way0)= (0,0,1,0) for specifying the replace target way, are outputted from the logic circuit element shown in FIG. 9. This indicates that if not hit (S101: No), the way2 (determined from the relation shown in FIG. 5) in the bit-on position is selected next time as the replace target way.

Thereafter, according to the rule shown in FIG. 5, it follows that a chance of becoming the replace target comes around in sequence. Namely, the latest updated way1 is selected as the replace target late to the greatest possible degree. Depending on combinations, however, the replace target chance might come around earlier by one than the latest case. In all the combinations, however, there is a case of "the replace chance comes around latest" or "the replace chance comes around earlier" by one than the latest case, and the system, though it is not the perfect LRU, operates in a state approximate to the LRU.

According to the storage device 100 in this embodiment, the 1-bit replace flags are prepared for each way, the entry replace control is conducted based on the replace flags R and the valid signals V according to the rule, and the replace flags R are updated, thereby actualizing the replacement of the entry in the storage unit with the operation approximate to the LRU. Information necessary for attaining this is only the 1-bit flag per way. Further, the same information is, when transmitted outside, compressed further in 1-bit. This implies that the cost becomes by far lower than by the method such as the conventional LRU.

Next, a modified example of the embodiment discussed above will be described.

Figure 14:
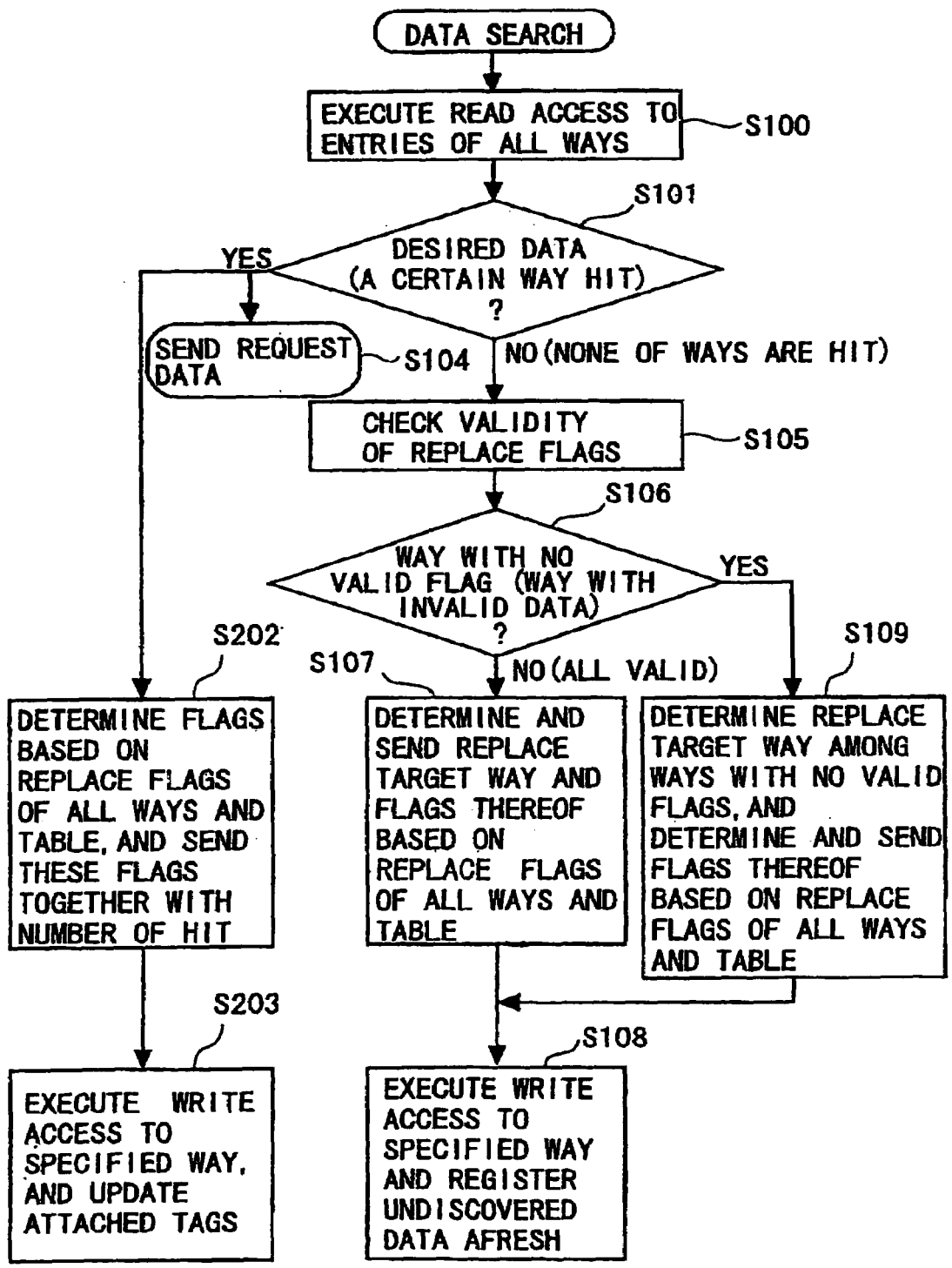
FIG. 14 is an explanatory flowchart showing an operation of the storage device in the 4-way set associative system in a modified example of the embodiment of the present invention.

The embodiment discussed above has exemplified the case where if not hit (S101: No) , the replace flag R is updated (S108, S109), however, the present invention is not limited to this scheme. For example, if hit, the replace flag R maybe updated. FIG. 14 shows an example of updating the replace flag R if hit. FIG. 14 is a flowchart, wherein steps S202 and S203 replace S102 and S103 in the flowchart shown in FIG. 13. Other steps are the same as those explained above, and therefore the repetitive explanations thereof are omitted.

If hit (S101: Yes) , the replace flag R is determined according to the replace flags R read from all the ways and the Table shown in FIG. 6, and the determined flag is sent together with the hit way selection signal for specifying the hit way to the branch history search result judging unit 104 (S102). The thus determined replace flag R is thereby written to the way specified by this selection signal (S203). Further, the attached tags are updated and so on (S103).

With this operation, the replace flag R is updated according to the Table shown in FIG. 6, whereby the latest hit way is selected as the replace target as late as possible.

Further, the embodiment discussed above has exemplified the case where if none of the ways are hit (S101), the replace target way selection unit 107 executes the replace target way selection process (S106 through S109). The present invention is not, however, restricted to this scheme. For instance, the storage device 100 may be a cache memory device (that is disposed between, e.g., the main storage unit and the processor) which does not include the branch history search result judging unit 104.

Moreover, the embodiment discussed above has exemplified the storage unit in the 4-way set associative system (where N=4). The present invention is not, however, limited to this storage unit. For example, the N-ways may be extended to square-of-2 ways such as 2, 4, 8, 16, 32 and so on. Further, integer-numbered ways other than the above-mentioned can be actualized in a form approximate thereto.

The present invention can be embodied in a variety of forms without departing from the spirit or the principal features of the present invention. Therefore, the embodiment is no more than a mere exemplification in every point.

As discussed above, according to the present invention, in the storage unit having N-pieces of ways in the set associative system, the way having the entry wherein the registration and the replacement are executed, can be selected at by far lower cost than by the LRU method in a way that exhibits the performance approximate to the LRU.

What is claimed is:

1. A storage device in a set associative system, comprising:
    N-pieces (N is an integer of 2 or larger) of ways each having a plurality of entries containing at least replace flags and predetermined data;
    an acquisition unit acquiring the replace flags contained in the entries specified by the same address from said N-pieces of ways; and
    a selection unit selecting a replace target way by detecting values of all of the replace flags acquired by said acquisition unit regardless of the values detected.

2. A storage device in a set associative system according to claim 1, further comprising a predetermined data update unit updating the predetermined data contained in the entry included in said way selected by said selection unit among the entries specified by the same address.

3. A storage device in a set associative system according to claim 2, further comprising a replace flag update unit updating the replace flags so that the replace target way is next selected, when possible, after all other ways, other than the replace target way, have been selected.

4. A storage device in a set associative system according to claim 3, wherein said replace flag update unit executes updating based on the replace flag which is one bit.

5. A storage device in a set associative system according to claim 3, wherein said flag update unit, when at least one entry is invalid, updates the replace flags by inverting the replace flag of the replace target way and an immediately following way, with an initial way immediately following a final way.

6. A storage device in a set associative system according to claim 1,
    further comprising a judging unit judging whether all the entries specified by the same address are valid or not,
    wherein said selection unit, when said judging unit judges that at least one entry is invalid, selects the way having the invalid entry irrespective of the replace flags.

7. A storage device in a set associative system according to claim 1, wherein each of said entries contains valid flags,
    said acquisition unit acquires the valid flags contained in the entries specified by the same address, and
    said judging unit judges based on the valid flags acquired by said acquisition unit whether all the entries are valid or not.

8. A storage device in a set associative system according to claim 1, further comprising a branch prediction unit performing a branch prediction on the basis of the same address,
    wherein said selection unit, if said branch prediction unit does not predict branching, selects a replace target way.

9. A cache memory device in a set associative system, comprising:
    N-pieces (N is an integer of 2 or larger) of ways each having a plurality of entries containing at least replace flags and predetermined data;
    an acquisition unit acquiring the replace flags contained in the entries specified by the same address from said N-pieces of ways; and
    a selection unit selecting a replace target way by detecting values of all of the replace flags acquired by said acquisition unit regardless of the values detected.

10. A cache memory device in a set associative system according to claim 9, further comprising a predetermined data update unit updating the predetermined data contained in the entry included in the replace target way selected by said selection unit among the entries specified by the same address.

11. A cache memory device in a set associative system according to claim 10, further comprising a replace flag update unit updating the replace flags so that the replace target way is next selected, when possible, after all other ways, other than the replace target way have been selected.

12. A cache memory device in a set associative system according to claim 11, wherein said replace flag update unit executes updating based on a 1-bit replace flag.

13. A cache memory device in a set associative system according to claim 11, wherein said replace flag update unit, when at least one entry is invalid, updates the replace flags by inverting the replace flag of the replace target way and an immediately following way, with an initial way immediately following a final way.

14. A cache memory device in a set associative system according to claim 9, further comprising a judging unit judging whether all the entries specified by the same address are valid or not,
    wherein said selection unit, when said judging unit judges that at least one entry is invalid, selects the way having the invalid entry irrespective of the replace flags.

15. A cache memory device in a set associative system according to claim 14, wherein each of said entries contains valid flags,
    said acquisition unit acquires the valid flags contained in the entries specified by the same address, and
    said judging unit judges based on the valid flags acquired by said acquisition unit whether all the entries are valid or not.

16. A replace target way selection method in a storage device, in a set associative system, having N-pieces (N is an integer of 2 or larger) of ways each having a plurality of entries containing at least replace flags and predetermined data, said method comprising:
    acquiring the replace flags contained in the entries specified by the same address from said N-pieces of ways; and
    selecting a replace target way by detecting values of all of the replace flags acquired by said acquisition regardless of the values detected.

17. A set associative system storage, comprising:
    ways, each having entries with replace flags and data;
    an acquisition unit acquiring the replace flags for the entries specified by a single address for a plurality of said ways; and
    a selection unit selecting a replace target way by detecting values of all of the replace flags acquired by said acquisition unit for any address of the values detected.

18. A set associative system storage according to claim 17, wherein a one-bit replace flag is used for each way of accessing the entries specified by the single address.

* * * * *

UNITED STATES PATENT AND TRADEMARK OFFICE
CERTIFICATE OF CORRECTION

| | | |
|---|---|---|
| PATENT NO. | : 7,007,136 B2 | Page 1 of 1 |
| APPLICATION NO. | : 10/341456 | |
| DATED | : February 28, 2006 | |
| INVENTOR(S) | : Megumi Yokoi et al. | |

It is certified that error appears in the above-identified patent and that said Letters Patent is hereby corrected as shown below:

Column 11, line 28, delete "said" and insert --the replace target--

Column 11, line 39, after "said", insert --replace--

Signed and Sealed this

Seventeenth Day of October, 2006

JON W. DUDAS
*Director of the United States Patent and Trademark Office*